United States Patent
Peters

(10) Patent No.: US 10,320,718 B2
(45) Date of Patent: Jun. 11, 2019

(54) MAINTAINING MESSAGE PRIVACY ON AN EXPOSED DISPLAY DEVICE

(75) Inventor: Mark E. Peters, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 796 days.

(21) Appl. No.: 13/613,856

(22) Filed: Sep. 13, 2012

(65) Prior Publication Data

US 2013/0013708 A1 Jan. 10, 2013

Related U.S. Application Data

(63) Continuation of application No. 10/905,499, filed on Jan. 7, 2005, now Pat. No. 8,346,871.

(51) Int. Cl.
*H04L 12/58* (2006.01)
*G06Q 10/10* (2012.01)

(52) U.S. Cl.
CPC ............ *H04L 51/04* (2013.01); *G06Q 10/10* (2013.01); *H04L 51/24* (2013.01)

(58) Field of Classification Search
USPC ................................................ 709/204–207
See application file for complete search history.

(56) References Cited

U.S. PATENT DOCUMENTS

| | | | |
|---|---|---|---|
| 5,990,931 A * | 11/1999 | Nimri et al. | 348/14.08 |
| 6,301,609 B1 | 10/2001 | Aravamudan et al. | |
| 6,484,196 B1 | 11/2002 | Maurille | |
| 6,640,230 B1 | 10/2003 | Alexander et al. | |
| 6,747,970 B1 * | 6/2004 | Lamb | H04L 12/6418 370/352 |
| 6,757,362 B1 * | 6/2004 | Cooper | H04M 3/527 379/88.01 |
| 6,909,406 B2 | 6/2005 | Wilburn et al. | |
| 6,993,564 B2 * | 1/2006 | Whitten, II | H04L 29/06 709/205 |
| 7,035,865 B2 | 4/2006 | Doss et al. | |
| 7,216,167 B2 | 5/2007 | Hamilton, II et al. | |
| 7,243,124 B1 | 7/2007 | Gardner et al. | |
| 7,418,497 B2 | 8/2008 | Hagale et al. | |
| 7,499,973 B2 * | 3/2009 | Couts et al. | 709/206 |

(Continued)

FOREIGN PATENT DOCUMENTS

WO 2004001558 A2 12/2003

OTHER PUBLICATIONS

United States Patent and Trademark Office, Office Action for U.S. Appl. No. 10/891,797, dated Oct. 16, 2007, pp. 1-11, Alexandria, VA, USA.

(Continued)

*Primary Examiner* — Minh Chau Nguyen
(74) *Attorney, Agent, or Firm* — Lee Law, PLLC; Christopher B. Lee

(57) ABSTRACT

A determination is made as to whether a computer is in a slide presentation mode. In response to determining that the computer is in the slide presentation mode, a configured designee alert mode is automatically selected. Message data is received through a communications medium. The message data is transferred to an alternate designated recipient according to the automatically selected designee alert mode when the computer is in the slide presentation mode.

6 Claims, 7 Drawing Sheets

(56) References Cited

U.S. PATENT DOCUMENTS

| | | | |
|---|---|---|---|
| 7,818,375 B2* | 10/2010 | Malik | G06Q 10/107 709/204 |
| 2001/0003202 A1 | 6/2001 | Mache et al. | |
| 2004/0010808 A1 | 1/2004 | deCarma | |
| 2004/0015610 A1 | 1/2004 | Treadwell | |
| 2004/0034723 A1* | 2/2004 | Giroti | H04L 12/1822 710/8 |
| 2004/0078441 A1* | 4/2004 | Malik et al. | 709/206 |
| 2004/0133638 A1 | 7/2004 | Doss et al. | |
| 2004/0143633 A1 | 7/2004 | McCarty | |
| 2004/0186887 A1 | 9/2004 | Galli et al. | |
| 2004/0186895 A1* | 9/2004 | Ellis | G06Q 10/107 709/207 |
| 2004/0196315 A1 | 10/2004 | Swearingen et al. | |
| 2004/0254998 A1* | 12/2004 | Horvitz | G06Q 10/107 709/206 |
| 2005/0021651 A1 | 1/2005 | Fellenstein et al. | |
| 2005/0027669 A1 | 2/2005 | Day et al. | |
| 2005/0027839 A1 | 2/2005 | Day et al. | |
| 2005/0076338 A1* | 4/2005 | Malik | G06Q 30/02 718/100 |
| 2005/0097470 A1* | 5/2005 | Dias et al. | 715/723 |
| 2005/0097473 A1 | 5/2005 | Malik et al. | |
| 2005/0235035 A1* | 10/2005 | Benejam | G06Q 10/109 709/206 |
| 2006/0015609 A1 | 1/2006 | Hagale et al. | |
| 2006/0072715 A1* | 4/2006 | Michael | H04M 3/53366 379/88.12 |

OTHER PUBLICATIONS

United States Patent and Trademark Office, Notice of Allowance for U.S. Appl. No. 10/891,797, dated Apr. 28, 2008, pp. 1-11, Alexandria, VA, USA.

United States Patent and Trademark Office, Office Action for U.S. Appl. No. 10/905,499, dated Aug. 1, 2008, pp. 1-24, Alexandria, VA, USA.

United States Patent and Trademark Office, Office Action for U.S. Appl. No. 10/905,499, dated Nov. 26, 2008, pp. 1-7, Alexandria, VA, USA.

United States Patent and Trademark Office, Office Action for U.S. Appl. No. 10/905,499, dated Apr. 16, 2009, pp. 1-18, Alexandria, VA, USA.

United States Patent and Trademark Office, Office Action for U.S. Appl. No. 10/905,499, dated Sep. 15, 2009, pp. 1-24, Alexandria, VA, USA.

United States Patent and Trademark Office, Office Action for U.S. Appl. No. 10/905,499, dated Dec. 17, 2009, pp. 1-9, Alexandria, VA, USA.

United States Patent and Trademark Office, Office Action for U.S. Appl. No. 10/905,499, dated May 17, 2010, pp. 1-13, Alexandria, VA, USA.

United States Patent and Trademark Office, Office Action for U.S. Appl. No. 10/905,499, dated Apr. 26, 2011, pp. 1-13, Alexandria, VA, USA.

United States Patent and Trademark Office, Office Action for U.S. Appl. No. 10/905,499, dated Nov. 1, 2011, pp. 1-17, Alexandria, VA, USA.

United States Patent and Trademark Office, Notice of Allowance for U.S. Appl. No. 10/905,499, dated Aug. 17, 2012, pp. 1-9, Alexandria, VA, USA.

* cited by examiner

QUERY OUTPUT DEVICE FOR PROPERTIES THAT ARE KNOWN TO BELONG TO PROJECTION DEVICES — 1302

FIG. 13

QUERY A POWER MANAGEMENT MODE TO DETERMINE IF THE USER HAS PLACED COMPUTER IN A PRESENTATION MODE OR A VIEWING MODE — 1402

FIG. 14

MAINTAINING MESSAGE PRIVACY ON AN EXPOSED DISPLAY DEVICE

RELATED APPLICATIONS

This application is a continuation of and claims priority to and claims the benefit of U.S. patent application Ser. No. 10/905,499 titled "A SYSTEM FOR MAINTAINING MESSAGE PRIVACY ON AN EXPOSED DISPLAY DEVICE," which has had a title change to "MAINTAINING MESSAGE PRIVACY ON AN EXPOSED DISPLAY DEVICE," which was filed in the United States Patent and Trademark Office on Jan. 7, 2005, which has a current status of "Allowed," and which is incorporated herein by reference in its entirety.

BACKGROUND

The present invention is a process for using electrical computers or data processing machines to transfer data via one or more communications media. In particular, the present invention comprises an improved demand-based messaging system that enables instant message recipients to protect their privacy on an exposed display device.

Demand-based messaging is a communication service that allows users to exchange message data, such as text, over a network or other communications media, in real time. Probably the most common medium for exchange is the Internet. Instant messaging (IM) is perhaps the most widely known and used embodiment of demand-based messaging. Today, most network and online service providers offer some form of IM service.

IM users typically use a networked computer and IM client software to exchange messages with one another in conversational style. An IM client provides an interface for users to compose, send, receive, and read text messages. IM sessions (colloquially referred to as "chats") are often lengthy, with multiple participants each taking many turns "speaking" in the chat window. Examples of IM clients that are popular today include IBM's SameTime, MSN Messenger, and Yahoo/AOL Instant Messenger.

Typically, an IM service alerts an IM client whenever a user receives an instant message. The alert usually consists of a pop-up window or other visual indication on a user's display, but may include an audible indicator as well. Many IM clients, though, instantaneously display the message on the user's display without any alert. Most IM clients also allow a user to maintain a private list of other IM users. The IM client then alerts the user when the other users in the private list are online. Again, an alert usually consists of some visual or audible indication, or any combination of the two. The alerted user can then initiate a chat with the user in the private list who is online.

Occasionally, though, IM alerts can have unintended and undesirable effects. For instance, if a user's display is exposed to an audience when the user receives an alert, the alert also would be exposed to the entire audience. Examples of such exposed displays abound, including large screens used for slide show presentations and network-based multimedia presentations. Even if a user is merely allowing an associate to view the user's display and receives an alert, the associate also would be able to see or hear the alert. Not only are such situations potentially annoying or embarrassing, but they also could result in the unintended disclosure of personal or confidential information.

Presently, some IM clients can be configured to prevent some instances of undesirable alerts. Most IM clients, in fact, can be configured to allow messages only from a preferred group of users (such as those in the private list), to block messages only from certain users, or to block all messages from all users. Moreover, IM technology continues to evolve at a rapid pace, and more sophisticated techniques for managing a user's privacy have been disclosed recently.

In particular, U.S. patent publication 2004/10808 discloses a system for automatically managing a user's visibility and alerts on an IM network, based on the user's activity and activity-related preferences. Specifically, the user of such a system establishes preferences for an activity, such as watching a particular channel or video stream. The system then monitors the user's activity and manages IM alerts when the user is engaged in an activity with established preferences.

U.S. patent publication 2004/143633 discloses another privacy management technique in which privacy codes are exchanged between users before delivering an instant message. Although this technique protects the message itself, the IM client still alerts a user in the same manner after the privacy codes are accepted.

Although the techniques described above may prevent some instances of undesirable alerts on an exposed display, they also may prevent some instances of desired alerts. Thus, there is still a need in the art for an IM client that provides users with more sophisticated control over the information that the IM client displays on an exposed display device. The invention described in detail below addresses this need.

BRIEF SUMMARY

The invention described below is an improved instant-messaging system that minimizes undesirable alerts on an exposed output device. The system typically includes an instant-messaging program operable on a data processing machine to receive message data from a caller over a communications medium. The instant-messaging program is user-configurable so that a user can select an alert mode that alters the instant-messaging program's response to receiving message data from a caller when a user is operating an exposed output device. Specifically, a user can select either a "do-not-disturb" mode, a "designee" mode, a "caller-id" mode, or a "priority" mode. If the user selects the do-not-disturb mode, the instant-messaging program blocks the message data and informs the caller that the user does not wish to be disturbed. If the user selects the caller-id mode, the instant-messaging program displays the caller's identification and then prompts the user to accept or deny the message data. If the user selects the priority mode, the instant-messaging program displays the caller's identification only if the caller is in the user's "priority list."

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 3, FIG. 4, FIG. 5, FIG. 6, FIG. 7, FIG. 8, FIG. 9, FIG. 10, FIG. 11, FIG. 12, FIG. 13, and FIG. 14 are flowcharts of computer programs and portions of computer programs embodying the present invention.

DETAILED DESCRIPTION

Figure 1:
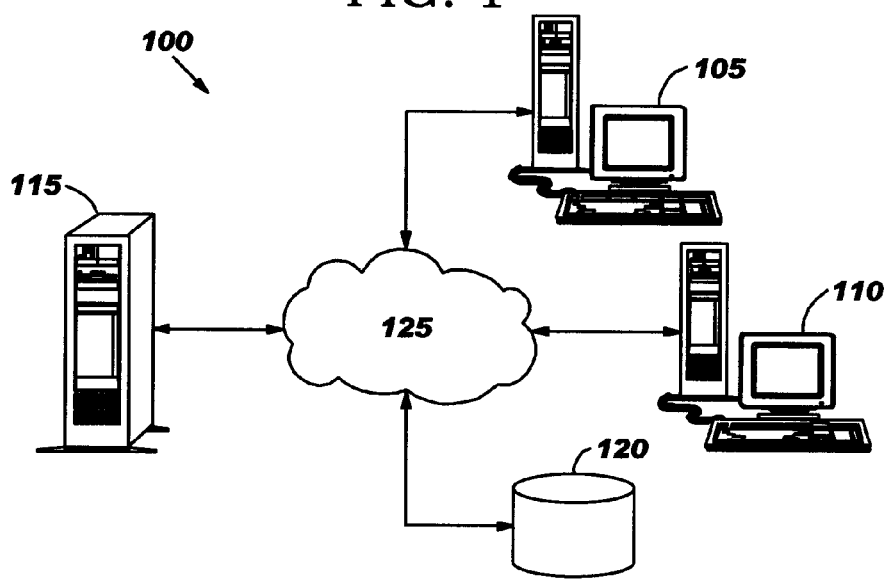
FIG. 1 is a flowchart of the improved instant-messaging program.

As is well-known in the computing arts, there are often a variety of means for implementing any given processing function. In particular, most processing may be implemented with computer hardware, computer software, or any combination thereof. Likewise, the principles of the present invention are applicable to a variety of computer hardware and software configurations, and the means for implementing any given function described below, whether hardware or software, are illustrative only. From this description, any person of ordinary skill in the computing arts may readily develop equivalent combinations of hardware and software that perform identical functions.

The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "instant-messaging (IM)" program.

Means for enabling an operator to interact with such a computer program are well-known in the art. The particular means for enabling an operator to enter or view data are of little significance to the novelty of the present invention, and generally are not described in detail here. Thus, for the purposes of describing a preferred embodiment, and unless otherwise indicated, the inventive computer program interacts with an operator through conventional means, such as keyboards, mice, video monitors, input files, dialog boxes, voice recognition, or the like, although a person of ordinary skill in the art may readily recognize additional hardware, software, or any combination thereof that performs the identical function.

The functions of the IM program described below are applicable to many different messaging scenarios, including scenarios wherein any program, device driver, operating system, or the like attempts to notify a user of an event or condition through audio or visual cues. Nonetheless, for the sake of simplicity and clarity, the IM program is described below in the context of a typical chat session in which the term "caller" refers to any user of an IM system who attempts to initiate a chat with a recipient. The term "recipient," as used herein, refers to any user of the IM program. Moreover, the following discussion generally assumes that the recipient is using a computer with an exposed output device. As used herein, an "output device" is any hardware operable to display data to a user, and an "exposed" output device is any output device visible to anyone other than the recipient.

Additionally, the IM program is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
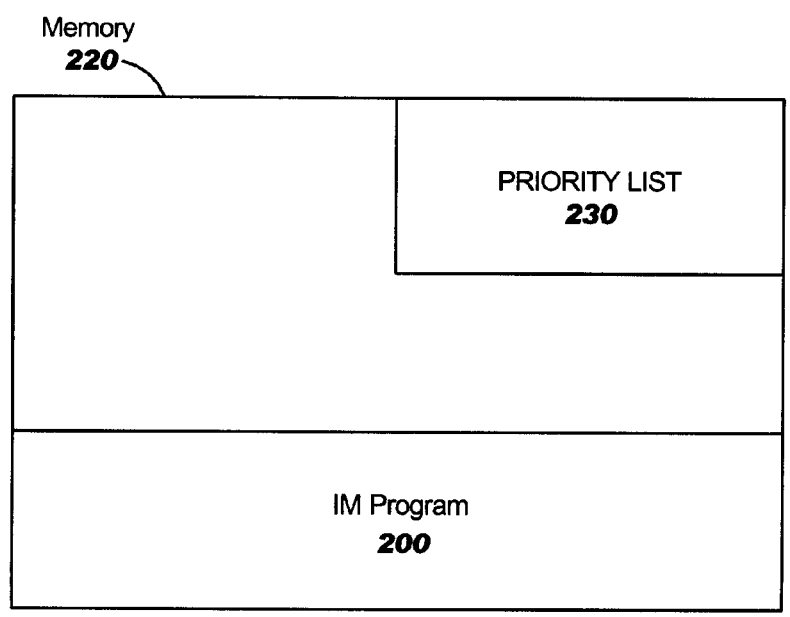
FIG. 2 is a representative schematic of a memory having the components of the present invention.

IM program 200 typically is stored in a memory, represented schematically as memory 220 in FIG. 2. The term "memory," as used herein, includes without limitation any volatile or persistent medium (computer readable medium), such as an electrical circuit, magnetic disk, or optical disk, or other computer-readable storage medium in which a computer can store data or software. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to IM program 200, memory 220 may include priority list 230 with which IM program 200 interacts.

Figure 4:
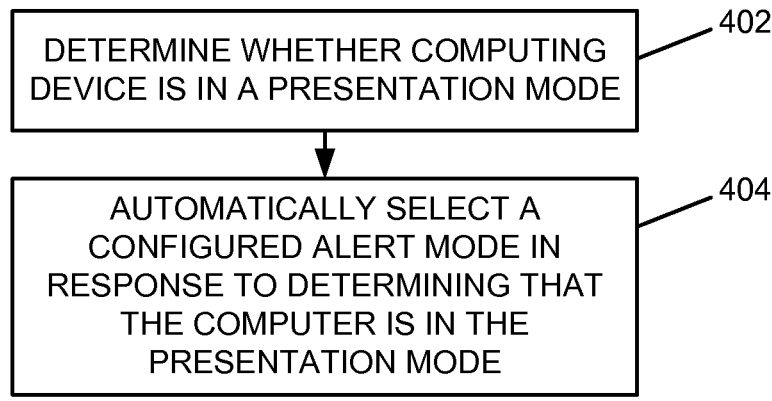
Figure 5:
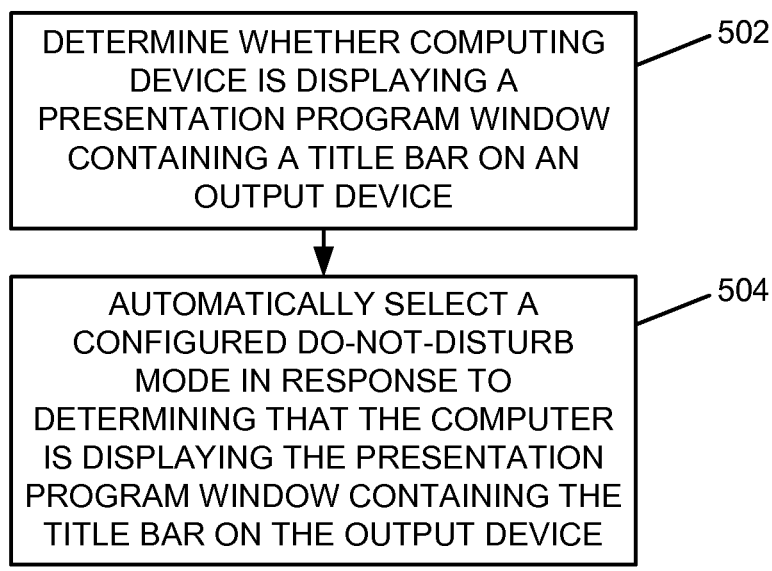
Figure 6:
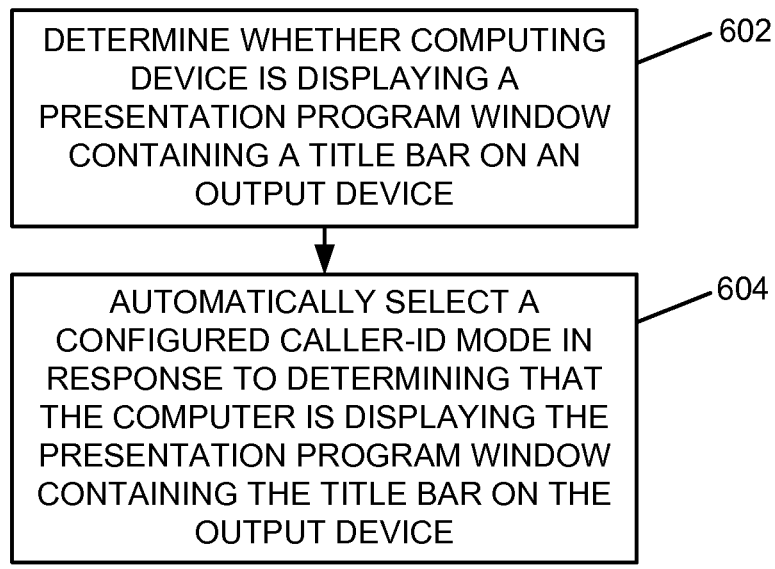
Figure 7:
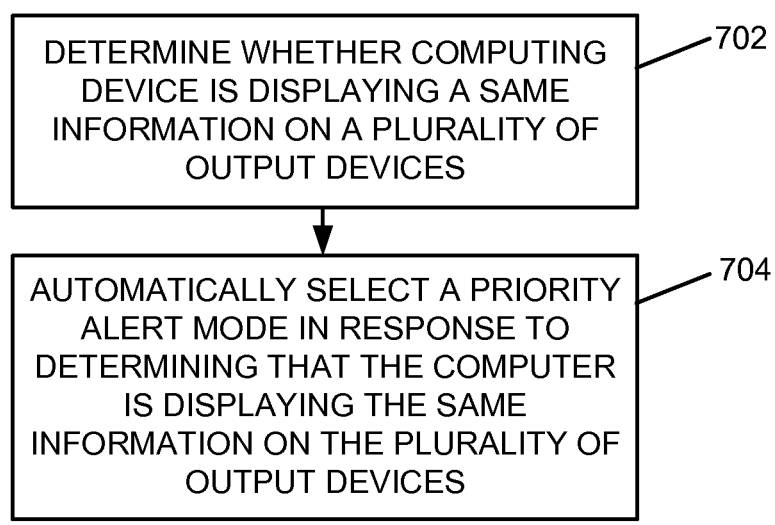
Figure 8:
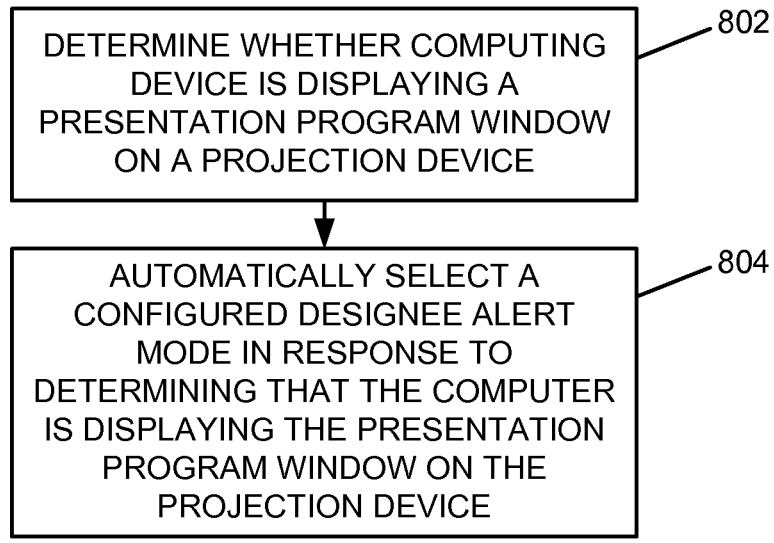
Figure 9:
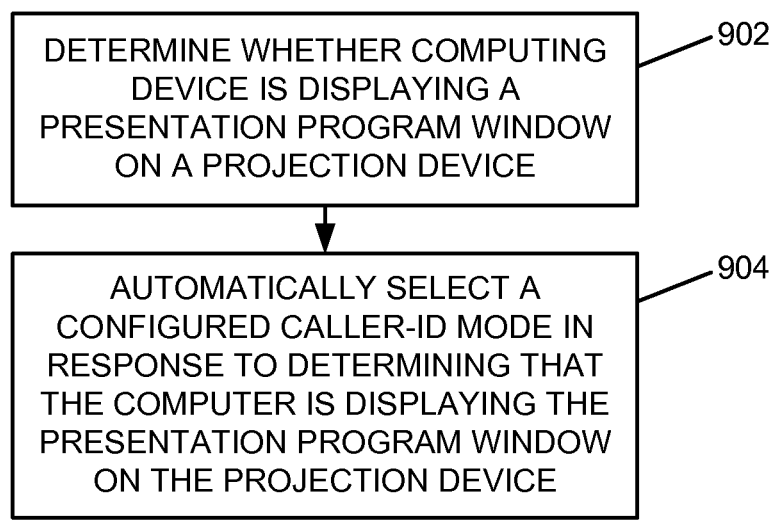
Figure 10:
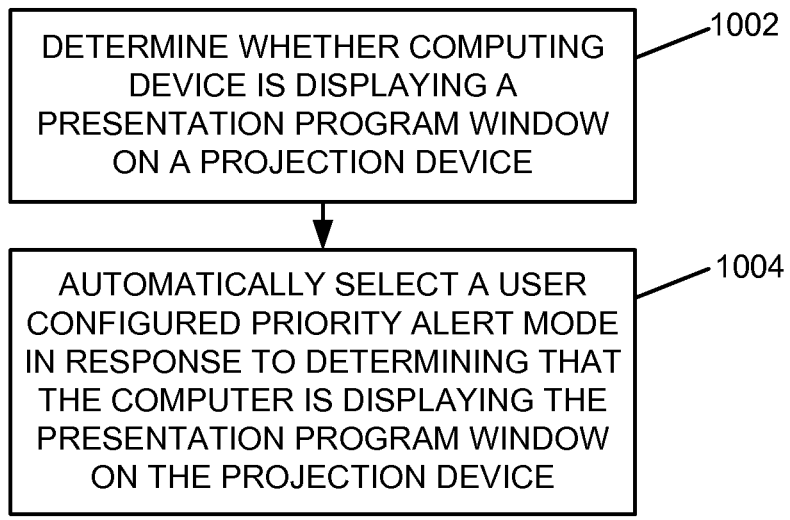
Figure 11:
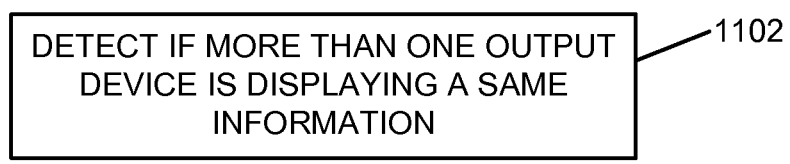
Figure 12:

Operating systems, such as MICROSOFT WINDOWS, often know what types of devices are attached to the video adapter, and IM program 200 can obtain the device type from the operating system. Similarly, IM program 200 can obtain information about other programs from the operating system. For example, if a user is running a network conferencing program, such as MICROSOFT NETMEETING or WEBEX, IM program 200 can obtain this information from the operating system to determine that computer is in presentation mode. Moreover, presentation programs such as MICROSOFT POWERPOINT generally display slides in a window without a title bar when in presentation mode. Thus, IM program 200 can query such a presentation program to see if the program's window has a title bar (FIG. 5, element 502; FIG. 6, element 602). Other means for determining when a workstation is in a presentation mode (FIG. 4, element 402) include: detecting if more than one output device is displaying the same information (such as an external monitor and an LCD screen on a laptop) (FIG. 7, element 702; FIG. 11, element 1102); comparing an output device with a list of known projection devices (FIG. 8, element 802; FIG. 9, element 902; FIG. 10, element 1002; FIG. 12, element 1202); querying an output device for properties that are known to belong to projection devices (FIG. 13, element 1302); or querying the workstation's power management mode to determine if the user has placed it in presentation mode or DVD viewing mode (FIG. 14, element 1402).

A situation may arise in which a user is giving a presentation on the user's own output device and the user's own output device will not be detected as an exposed output device. In such a situation, the user may manually designate the user's output device as an exposed device.

Thus, if a projector or the like is attached, if the recipient is using presentation software in presentation mode (FIG. 4, element 402), IM program 200 can acquire this information from the operating system or other program. IM program 200 then assumes that the workstation is configured for a presentation and automatically selects the recipient's desired alert mode (FIG. 4, element 404; FIG. 8, element 804; FIG. 9, element 904; FIG. 10, element 1004). Optionally, this information may be used to update the recipient's status icon and status message as seen by other IM users. Or, rather than make an automatic selection, IM program 200 may prompt the recipient to confirm the change in alert mode. In yet another embodiment, the recipient configures IM program 200 to select a desired alert mode based upon schedule data in a personal information manager program or a calendar program, so that IM program 200 selects the appropriate mode if, according to the schedule data, the recipient is in a meeting or the like.

Figure 3:
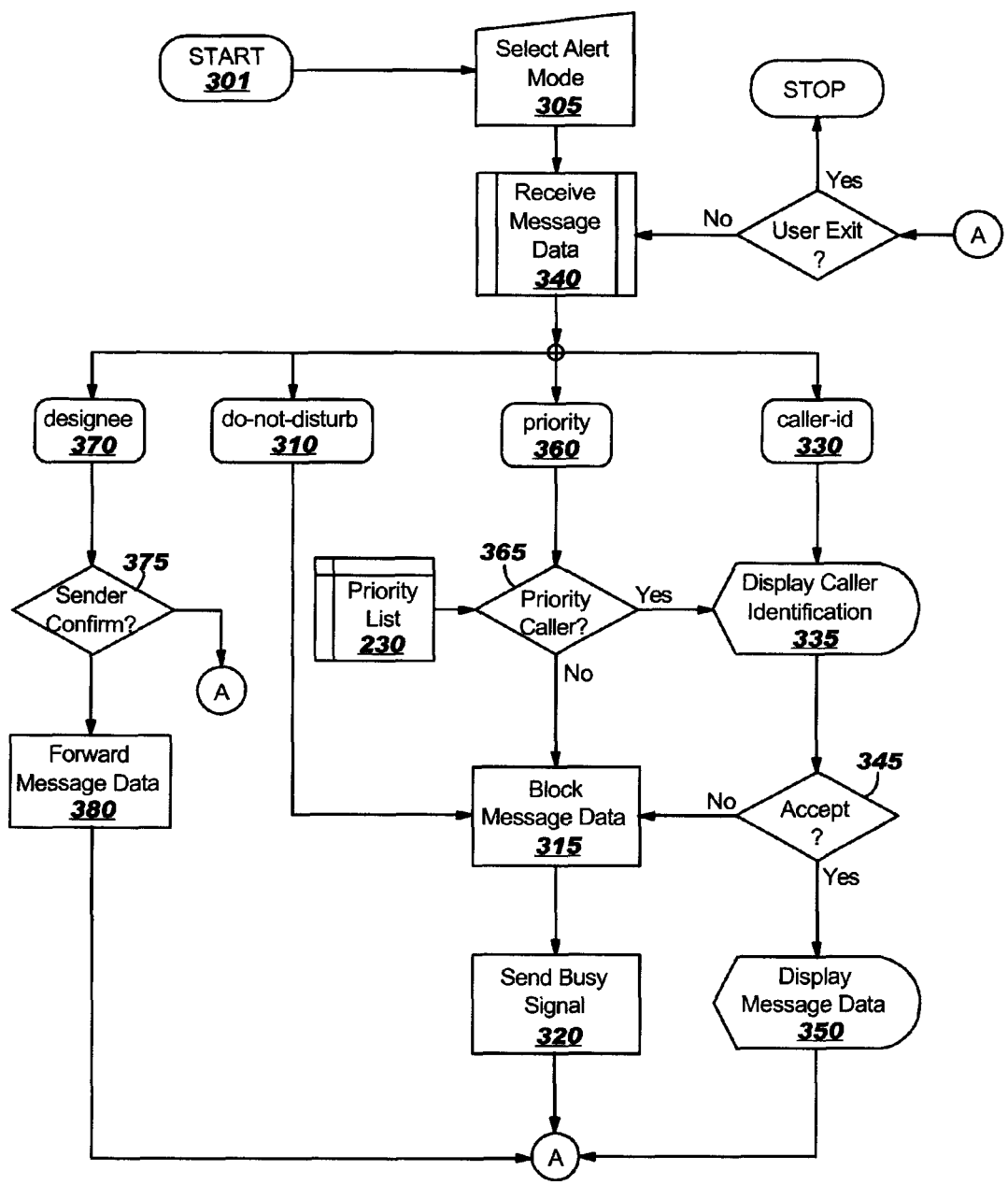

FIG. 3 is a flowchart of IM program 200. For illustrative purposes, the following discussion of FIG. 3 assumes that IM program 200 is stored within the memory of workstation 105. Thus, once started (301) IM program 200 continuously monitors workstation 105 for configuration changes, and monitors network connection 125 for message data addressed to the recipient using workstation 105. After starting IM program 200, the recipient selects a desired alert mode (305). Alternatively, the recipient configures IM program 200 to select a desired alert mode automatically when workstation 105 is configured for a presentation (FIG. 4, element 404; FIG. 5, element 504; FIG. 8, element 804). Alert modes are a means for identifying the recipient's messaging preferences and processing message data during a presentation. In the embodiment described below, alert modes include a "do-not-disturb" mode (FIG. 5, element 504), a "designee" mode, a "caller-id" mode (FIG. 6, element 604; FIG. 9, element 904), and a "priority" mode (FIG. 7, element 704; FIG. 10, element 1004).

If the recipient selects the do-not-disturb mode (310), then IM program 200 blocks incoming message data (315) and informs all callers that the recipient is busy (320).

If the recipient selects the caller-id mode (330), then IM program 200 displays a caller's identification (335), such as the caller's real name or email address, upon receiving the caller's message data (340). IM program 200 then prompts the recipient to accept or refuse the message data (345). If the recipient opts to accept the message data from the caller, then IM program 200 displays the message data on the recipient's output device (350). If the recipient opts to refuse the message data, then IM program 200 blocks the incoming message data (315) and informs the caller that the recipient is busy (320).

If the recipient selects the priority mode (360), then IM program 200 blocks incoming message data (315) unless a caller is in the recipient's priority list 230 (365). If the caller is in priority list 230, then IM program 200 displays the caller's identification (335), or in an alternative embodiment, IM program 200 prompts the priority caller before displaying the caller's identification to confirm that the message is urgent before displaying the caller's identification. IM program 200 then prompts the recipient to accept or refuse the message data (345). If the recipient opts to accept the message data from the priority caller, then IM program 200 displays the message data on the recipient's output device (350). If the recipient opts to refuse the message data, then IM program 200 blocks incoming message data (315) and informs all callers that the recipient is busy (320). Note that, as used herein, the term "priority list" refers to any list or other data structure, such as an address book, in which the recipient has identified specific IM users for whom IM program 200 should display their identification and prompt the recipient to accept or refuse the message data. In a preferred embodiment, priority list 230 is internal to IM program 200 and IM program 200 provides an interface through which the recipient can manage priority list 230. For instance, IM program 200 can automatically configure priority list 230 by adding everyone in the recipient's address book to the priority list. Other alternatives include IM program 200 identifying and adding peers and higher ranking associates within an organization to priority list 230, or allowing the recipient to add individual contacts to priority list 230.

Finally, if the recipient selects designee mode (370), IM program 200 notifies any sender that the recipient has designated an alternate recipient and prompts the sender to confirm that the message should be sent to the alternate recipient (375). If the sender confirms, IM program 200 then forwards any incoming message data to an alternate recipient (380), whom the recipient designates in advance. The designee mode is particularly useful if the recipient will be giving a presentation, but has an associate either assisting with the presentation or in the audience. In such a scenario, the recipient can designate the associate as the alternate recipient, and the alternate recipient then can respond to any messages that might affect meeting logistics during the presentation. Moreover, in alternative or additional embodiments of IM program 200, the designee mode may be combined with the priority mode or the caller-id mode to achieve even greater control over IM alerts. In such an embodiment, either the recipient or the alternate recipient selects such an enhanced mode, specifying either the priority mode or the caller-id mode. Then, either before or after forwarding the message to the alternate recipient, IM program 200 would process the message as described in detail above.

As noted above, the functions of IM program 200 also are applicable to other scenarios, including scenarios wherein any program, device driver, operating system, or the like attempts to notify a user of an event or condition while the user is operating an exposed output device. A dialog box or the like is the most common notification means. In such scenarios, a person of ordinary skill in the art may readily adapt the program to respond accordingly. Specifically, blocking the notification as described above may not be the most appropriate response, and it may be more advantageous merely to minimize the dialog box until the user is no longer operating the exposed output device. Alternatively, IM program 200 could be adapted to place the dialog box immediately in the background, and restore the presentation to the foreground, thus hiding the notification until the presentation is complete.

Preferred forms of the invention have been shown in the drawings and described above, but variations in the preferred forms will be apparent to those skilled in the art. The preceding description is for illustration purposes only, and the invention should not be construed as limited to the specific form shown and described. The scope of the invention should be limited only the language of the following claims.

What is claimed is:

1. A method for use with an instant messaging program running on a computer, the method comprising:

receiving first user input selecting a first mode;
responsive to the first user input, putting the instant messaging program in the first mode;
while the instant messaging program is in the first mode, receiving a first instant message;
responsive to receiving the first instant message, determining that the computer is driving an exposed output device;
responsive to receipt of the first instant message and further responsive to the determination that the computer is driving the exposed output device, blocking the first instant message according to first mode operation of the instant messaging program;
receiving second user input selecting a second mode;
responsive to the second user input, putting the instant messaging program in the second mode;
while the instant messaging program is in the second mode, receiving a second instant message;
responsive to receiving the second instant message, determining that the computer is driving the exposed output device;
responsive to receipt of the second instant message and further responsive to the determination that the computer is driving the exposed output device, displaying an identification of a sender of the second instant message, and querying to determine whether content of the second instant message should be displayed on the exposed output device being driven by the computer;
receiving third user input selecting a third mode;
responsive to the third user input, putting the instant messaging program in the third mode;
while the instant messaging program is in the third mode, receiving a third instant message;
responsive to receiving the third instant message, determining that the computer is driving the exposed output device;
responsive to receipt of the third instant message and further responsive to the determination that the computer is driving the exposed output device:
  determining that a sender of the third instant message is on a priority list; and
  responsive to the determination that the sender of the third instant message is on the priority list:
    displaying an identification of the sender of the third instant message; and
    querying to determine whether content of the third instant message should be displayed on the exposed output device being driven by the computer.

2. The method of claim 1, where:
determining that the computer is driving the exposed output device comprises determining that the computer is driving the exposed output device with output of a presentation generated by a presentation program operating in a presentation mode concurrently with the instant messaging program being in the first mode; and
blocking the first instant message according to the first mode operation of the instant messaging program comprises blocking display of the received first instant message on the exposed output device during the concurrent presentation mode operation of the presentation program with the first mode operation of the instant messaging program.

3. A computer messaging system comprising:
a communications medium;
an exposed output device; and
a computer connected to the communications medium and the exposed output device, configured to:
  receive first user input selecting a first mode;
  responsive to the first user input, put the instant messaging program in the first mode;
  while the instant messaging program is in the first mode, receive a first instant message via the communications medium;
  responsive to receiving the first instant message, determine that the computer is driving the exposed output device;
  responsive to receipt of the first instant message and further responsive to the determination that the computer is driving the exposed output device, block the first instant message according to first mode operation of the instant messaging program;
  receive second user input selecting a second mode;
  responsive to the second user input, put the instant messaging program in the second mode;
  while the instant messaging program is in the second mode, receive a second instant message via the communications medium;
  responsive to receiving the second instant message, determine that the computer is driving the exposed output device;
  responsive to receipt of the second instant message and further responsive to the determination that the computer is driving the exposed output device, display an identification of a sender of the second instant message, and query to determine whether content of the second instant message should be displayed on the exposed output device being driven by the computer;
  receive third user input selecting a third mode;
  responsive to the third user input, put the instant messaging program in the third mode;
  while the instant messaging program is in the third mode, receive a third instant message via the communications medium;
  responsive to receiving the third instant message, determine that the computer is driving the exposed output device;
  responsive to receipt of the third instant message and further responsive to the determination that the computer is driving the exposed output device:
    determine that a sender of the third instant message is on a priority list; and
    responsive to the determination that the sender of the third instant message is on the priority list:
      display an identification of the sender of the third instant message; and
      query to determine whether content of the third instant message should be displayed on the exposed output device being driven by the computer.

4. The computer messaging system of claim 3, where, in being configured to:
determine that the computer is driving the exposed output device, the computer is configured to determine that the computer is driving the exposed output device with output of a presentation generated by a presentation program operating in a presentation mode concurrently with the instant messaging program being in the first mode; and
block the first instant message according to the first mode operation of the instant messaging program, the computer is configured to block display of the received first instant message on the exposed output device during the concurrent presentation mode operation of the presentation program with the first mode operation of the instant messaging program.

5. A computer program product encoded in a computer-readable storage medium, comprising instructions that, when executed by a computer, cause the computer to:
receive first user input selecting a first mode;
responsive to the first user input, put the instant messaging program in the first mode;
while the instant messaging program is in the first mode, receive a first instant message;
responsive to receiving the first instant message, determine that the computer is driving an exposed output device;
responsive to receipt of the first instant message and further responsive to the determination that the computer is driving the exposed output device, block the first instant message according to first mode operation of the instant messaging program;
receive second user input selecting a second mode;
responsive to the second user input, put the instant messaging program in the second mode;
while the instant messaging program is in the second mode, receive a second instant message;
responsive to receiving the second instant message, determine that the computer is driving the exposed output device;
responsive to receipt of the second instant message and further responsive to the determination that the computer is driving the exposed output device, display an identification of a sender of the second instant message, and query to determine whether content of the second instant message should be displayed on the exposed output device being driven by the computer;
receive third user input selecting a third mode;
responsive to the third user input, put the instant messaging program in the third mode;
while the instant messaging program is in the third mode, receive a third instant message;
responsive to receiving the third instant message, determine that the computer is driving the exposed output device;
responsive to receipt of the third instant message and further responsive to the determination that the computer is driving the exposed output device:
determine that a sender of the third instant message is on a priority list; and
responsive to the determination that the sender of the third instant message is on the priority list:
display an identification of the sender of the third instant message; and
query to determine whether content of the third instant message should be displayed on the exposed output device being driven by the computer.

6. The computer program product of claim 5, where, the instructions that, when executed by the computer, cause the computer to:
determine that the computer is driving the exposed output device cause the computer to determine that the computer is driving the exposed output device with output of a presentation generated by a presentation program operating in a presentation mode concurrently with the instant messaging program being in the first mode; and
block the first instant message according to the first mode operation of the instant messaging program cause the computer to block display of the received first instant message on the exposed output device during the concurrent presentation mode operation of the presentation program with the first mode operation of the instant messaging program.

* * * * *